United States Patent
Barnes et al.

(10) Patent No.: US 12,127,567 B2
(45) Date of Patent: Oct. 29, 2024

(54) LIQUID DAIRY BLEND FOR CULINARY FOOD PRODUCTS

(71) Applicant: SOCIÉTÉ DES PRODUITS NESTLÉ S.A., Vevey (CH)

(72) Inventors: Gale Jeffrey Barnes, Chagrin Falls, OH (US); Christine Frances Kunetz, Twinsburg, OH (US); Kyungsoo Woo, Broadview Heights, OH (US)

(73) Assignee: Societe des Produits Nestle S.A., Vevey (CH)

( * ) Notice: Subject to any disclaimer, the term of this patent is extended or adjusted under 35 U.S.C. 154(b) by 46 days.

(21) Appl. No.: 16/897,791

(22) Filed: Jun. 10, 2020

(65) Prior Publication Data
US 2020/0296981 A1    Sep. 24, 2020

Related U.S. Application Data

(62) Division of application No. 15/320,066, filed as application No. PCT/EP2015/063854 on Jun. 19, 2015, now Pat. No. 10,709,147.
(Continued)

(51) Int. Cl.
*A23C 9/15* (2006.01)
*A23C 9/152* (2006.01)
(Continued)

(52) U.S. Cl.
CPC .......... *A23C 9/1512* (2013.01); *A23C 9/1528* (2013.01); *A23C 9/1544* (2013.01);
(Continued)

(58) Field of Classification Search
CPC ....... A23L 23/00; A23L 23/10; A23C 9/1512; A23C 9/1528; A23C 9/1544; A23C 19/0904
See application file for complete search history.

(56) References Cited

U.S. PATENT DOCUMENTS 6,113,969 A * 9/2000 Bodor .................... A21D 13/38
426/580
6,558,716 B1   5/2003 Kent et al.
(Continued)

FOREIGN PATENT DOCUMENTS

EA       009071      10/2007
EP       0008908     3/1980
(Continued)

OTHER PUBLICATIONS

Article entitled "Homogenization: A Closer Look" printed from the Internet at http://www.raw-milk-facts.com/homogenization_T3.html, Jun. 21, 2012, 2 pages.
(Continued)

*Primary Examiner* — Changqing Li
(74) *Attorney, Agent, or Firm* — K&L Gates LLP

(57) ABSTRACT

A liquid dairy blend is suitable for being used in the preparation of dairy-based culinary sauces or prepared culinary dishes, and contains milk proteins and fat. The milk proteins are whey-protein and casein, the ratio of whey-protein:casein is from 0.3-0.5, and the pH of the liquid dairy blend is from 5.8-6.2. A method of producing the liquid dairy blend is also provided.

9 Claims, 4 Drawing Sheets

Related U.S. Application Data

(60) Provisional application No. 62/016,924, filed on Jun. 25, 2014.

(51) Int. Cl.

| | |
|---|---|
| *A23C 9/154* | (2006.01) |
| *A23C 11/04* | (2006.01) |
| *A23C 19/09* | (2006.01) |
| *A23L 23/00* | (2016.01) |
| *A23L 23/10* | (2016.01) |

(52) U.S. Cl.
CPC .......... *A23C 11/04* (2013.01); *A23C 19/0904* (2013.01); *A23L 23/00* (2016.08); *A23L 23/10* (2016.08)

(56) References Cited

U.S. PATENT DOCUMENTS

| | | |
|---|---|---|
| 2002/0094358 A1 | 7/2002 | Kuslys et al. |
| 2002/0192348 A1 | 12/2002 | Laye et al. |
| 2005/0226985 A1 | 10/2005 | Landon |
| 2010/0178402 A1* | 7/2010 | Ippolito ............ A23L 5/13 |
| | | 426/412 |
| 2010/0189866 A1 | 7/2010 | Degner |
| 2013/0251867 A1 | 9/2013 | Carre |
| 2016/0135473 A1 | 5/2016 | Caroe et al. |
| 2017/0150747 A1 | 7/2017 | Sasaki et al. |

FOREIGN PATENT DOCUMENTS

| | | |
|---|---|---|
| EP | 1980154 | 10/2008 |
| RU | 2292155 | 1/2007 |
| RU | 231033 | 11/2007 |
| WO | 9746111 | 12/1997 |
| WO | 2005002350 | 1/2005 |
| WO | 2005016015 | 2/2005 |

OTHER PUBLICATIONS

Augustin et al. "Use of blends of skim milk and sweet whey protein concentrates in reconstituted yogurt" The Australian Journal of Dairy Technology, Apr. 2003, vol. 58, No. 1, pp. 30-35, XP001166338.
Mintel "Cheesy Scalloped Potatoes", printed from the Internet at http://www.gnpd.com, 3 pages, XP002744478.
Mintel "Chicken Enchiladas Suiza", printed from the Internet at http://www.gnpd.com, 3 pages, XP002744477.
Rioux et al. "The Ratio of Casein to Whey Protein Impacts Yogurt Digestion In Vitro" Food Dig., 2012, vol. 3, pp. 25-35.
Irudayaraj, Nondestructive Testing of Food Quality,2008, Blackwell Publishing, p. 182 (hereinafter referred to as Irudayaraj).
Akkerman, "Effect of heating strategies on whey protein denaturation—Revisited by liquid chromatography quadrupole time-of-flight mass spectrometry", Journal of Dairy Science, 2016, 99(1), pp. 152-166.
Wijesinha-Bettoni et al., "Milk and dairy product composition", Milk and Dairy Products in Human Nutrition, 2013, 65 pages.
Ma et al., "Milk pH as a Function of $CO_2$ Concentration, Temperature, and Pressure in a Heat Exchanger1 ", J. Dairy Science, vol. 86, Issue No. 12, 2003, pp. 3822-3830.
Bakshi et al., "Effect of Fat Content and Temperature on Viscosity in Relation to Pumping Requirements of Fluid Milk Products1", Journal of Dairy Science, vol. 67, Issue No. 6, Jun. 1984, pp. 1157-1160.
"Viscosity and Thixotropy Index", Kummer Semiconductor Technology, 1 Page.
"Approximate Viscosities of Some Common Liquids", 2021, pp. 1-8.
European Opposition Received for Application No. EP15730773.7, mailed on Sep. 9, 2021, 31 Pages.

\* cited by examiner

Score "0" (best)

Score "5" (worst)

LIQUID DAIRY BLEND FOR CULINARY FOOD PRODUCTS

CROSS REFERENCE TO RELATED APPLICATIONS

The present application is a divisional of U.S. patent application Ser. No. 15/320,066 filed on Dec. 19, 2016, which is a National Stage of International Application No. PCT/EP2015/063854 filed on Jun. 19, 2015, which claims priority to U.S. Provisional Patent Application No. 62/016,924 filed Jun. 25, 2014, the entire contents of which are being incorporated herein by reference.

TECHNICAL FIELD

The present invention relates to a liquid dairy blend which is suitable for being used in the preparation of dairy-based culinary sauces or prepared culinary dishes. More specifically, the present invention is directed to a liquid dairy blend comprising milk proteins and fat, which can be used to reduce the amount of total fat used in such a culinary sauce or dish without compromising on the taste and appearance after cooking of said sauce or dish.

Many approaches have been explored in the prior art to improve the organoleptic properties of reduced fat dairy-based sauces. For example, additional ingredients such as dextrins, fibers, hydrocolloids, gums, chemically or physically-modified starches and combinations thereof have been implemented in an attempt to enhance the sensory properties of reduced fat dairy-based sauces, such as by improving viscosity. However, these additional ingredients add complexity to the composition and the method of making the composition. In addition, these additional ingredients typically do not achieve the mouthfeel and the "fat perception" obtained from consumption of a sauce without reduced fat, and, as a result, sauces including these additional ingredients are often perceived negatively by the consumer.

As another example, increasing homogenization pressure can decrease fat droplet size relative to standard methods of producing food compositions and thereby can reduce the amount of fat. However, the amount of fat reduction which can be achieved by increasing homogenization pressure is limited and typically cannot exceed a 20-30% reduction in fat.

Consumer demand continuously increases for healthier types of food products with lower fat content or even non-fat products, while not compromising on taste. Therefore, a need exists to improve the sensory profile of existing reduced fat products and achieve organoleptic properties that mimic levels obtained by higher fat contents.

The object of the present invention is to improve the state of the art and to provide a liquid dairy base which is suitable for being used in culinary food preparations, as for example in prepared dishes, for the purpose of reducing the overall amount of fat to be used in such a culinary food preparation: i) without reducing the perception of the total fat taste of said culinary food preparation and ii) without negatively affecting the overall visual aspect of said culinary food preparation when cooked e.g. in an oven.

The object of the present invention is achieved by the subject matter of the independent claims. The dependent claims further develop the idea of the present invention.

Accordingly, the present invention provides in a first aspect a liquid dairy blend comprising milk proteins and fat, wherein the milk proteins are whey-protein and casein; the ratio by weight of whey-protein:casein is from 0.3-0.5; and the pH of the liquid dairy blend is from 5.8-6.2.

In a second aspect, the present invention relates to a method of producing a liquid dairy blend comprising the steps of:
a. mixing a milk-protein composition with a whey protein concentrate to achieve a total whey-protein:casein weight ratio of 0.3-0.5;
b. optionally adding water, fat, oil and/or an emulsifier to the mixture of step a);
c. adjusting the pH of the mixture of step a) or b) to 5.8-6.2 with an organic acid;
d. homogenizing the mixture of step c); and
e. heating the mixture of step d) to a temperature from 85° C. 100° C. for a period of from 1.0 to 3 minutes.

In a still further aspect, the present invention also relates to a food product made with the use of the liquid dairy blend of the present invention.

It has been surprisingly found by the present inventors that when they produce a liquid dairy blend comprising the milk proteins whey-protein and casein in very specific amounts to each other, and treating this protein blend in the presence of oil and/or fat, at a pH ranging from 5.8-6.2, under a well-defined heat-treatment, a liquid dairy blend can be obtained which allows when added to a sauce to substantially reduce the amount of fat in a final dish, and this without compromising on the overall perception of the fat taste of that dish and without losing the glossy appearance of a smooth fatty surface of that sauce after cooking. Thereby, a reduction of fat contents of between 30 and 50% can be achieved, as shown below in Example 4.

Additional features and advantages are described herein, and will be apparent from the following Detailed Description and the figures.

DETAILED DESCRIPTION

Figure 1:
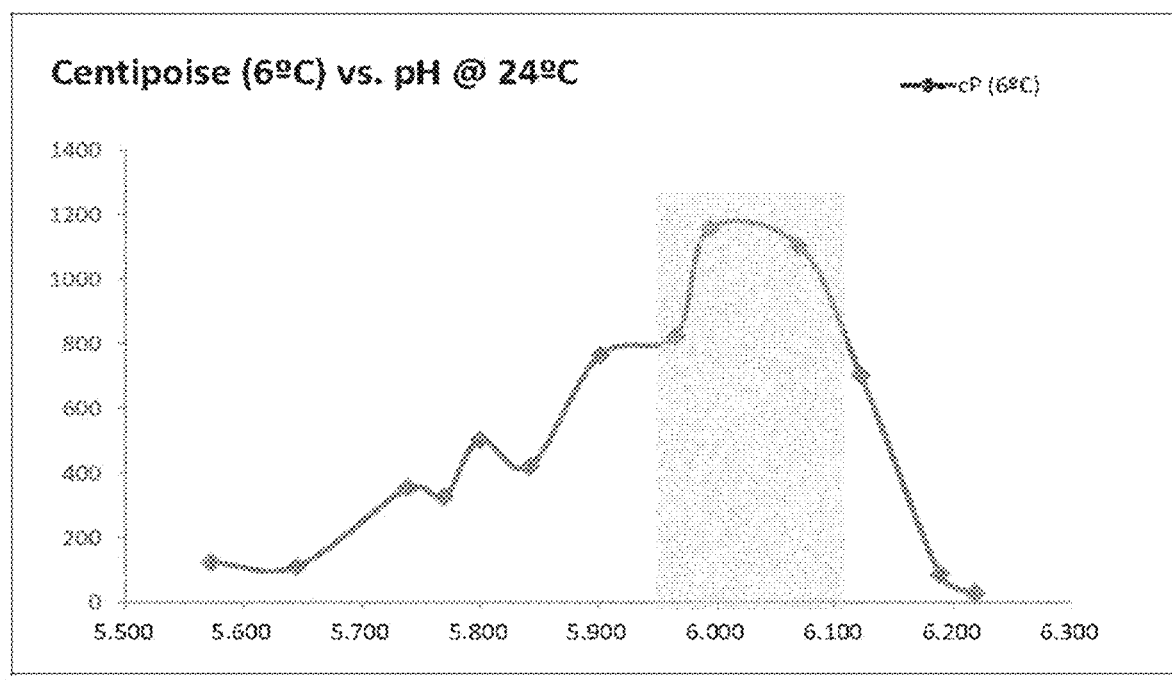
FIG. 1: Physical property of the Liquid Dairy Blends: Viscosity in dependence of pH value

The present invention pertains to a liquid dairy blend comprising milk proteins and fat, wherein: the milk proteins are whey-protein and casein; the weight ratio of whey-protein:casein is from 0.3-0.5; and the pH of the liquid dairy blend is from 5.8-6.2. Preferably, the pH of the liquid dairy blend is from 5.90-6.10.

The liquid dairy blend of the present invention is suitable for being used in the preparation of a culinary sauce or as a culinary sauce itself for the preparation of food dishes, preferably pre-prepared food dishes which are sold and distributed to consumers in either chilled or frozen state.

A "liquid dairy blend" is a composition comprising dairy proteins and which is liquid at room temperature; i.e. before being frozen, cooked, heated or baked in a following food product application. Typically, a liquid dairy blend is a food or beverage ingredient to be used in the production of food and beverage products.

"Fat" as of the present invention pertains to solid fat, such as milk fat, and/or liquid fat and oil, such as vegetable oils; wherein 'solid' and 'liquid' refer to the state of the fat/oil at room temperature.

"Whey protein" is a mixture of globular proteins isolated from whey. It is a typical by-product of the cheese making process.

"Casein" pertains to a family of related phospho-proteins commonly found in mammalian milk, i.e. αs1-, αs2-, β- and κ-caseins. They make up about 80% of the proteins in cow's milk and are typically the major protein component of cheese.

The "ratio" or "weight ratio" of whey-protein versus casein protein (i.e. whey-protein:casein) is defined in the present invention as the ratio of the weights (i.e. dry weights) of those respective proteins to each other.

The fat of the present invention is a solid fat, a liquid oil or a combination thereof. Preferably, the fat is selected from the group consisting of milk fat, soybean oil, canola oil, sunflower oil, corn oil, peanut oil, olive oil, cottonseed oil and coconut oil, or a combination thereof.

In a preferred embodiment, the liquid dairy blend of the present invention comprises an emulsifier. The emulsifier is preferably selected from the group consisting of monoglycerides, diglycerides, acacia gum and lecithin, or a combination thereof. Advantageously, those emulsifiers are helpful in the homogenization process to form a good emulsion with stable fat droplets having very small average diameters.

Preferably, the dairy blend of the present invention comprises 1-15 wt % fat, preferably from 5-12 wt % fat. As of the present invention, fat pertains here to solid fat and/or liquid oil, such as a vegetable oil, or a combination thereof. The solid or liquid state of the fat or oil is determined at room temperature.

In a preferred embodiment, the dairy blend of the present invention comprises fat droplets having an average diameter from 0.2 to 2 μm. Preferably, those fat droplets have an average diameter of 0.6-1.8 μm diameter.

In a still further preferred embodiment, the liquid dairy blend of the present invention comprises milk proteins and fat, wherein: the milk proteins are whey-protein and casein; the weight ratio of whey-protein:casein is from 0.35-0.43; and the pH of the liquid dairy blend is from 5.8-6.2, preferably, from 5.90-6.10.

A further aspect of the present invention relates to a method of producing a liquid dairy blend comprising the steps of:
  a. mixing a milk-protein composition with a whey protein concentrate to achieve a total whey-protein:casein ratio of 0.3-0.5;
  b. optionally adding water, fat, oil and/or an emulsifier to the mixture of step a);
  c. adjusting the pH of the mixture of step a) or b) to 5.8-6.2 with an organic acid;
  d. homogenizing the mixture of step c); and
  e. heating the mixture of step d) to a temperature from 85° C. 100° C. for a period of from 1.0 to 3 minutes.

Preferably, the total whey-protein:casein ratio of the present method in step a) is from 0.35-0.43.

Preferably, the pH in step c) of the present method is adjusted to 5.90-6.10.

In a further preferred embodiment, the heating of the mixture in step e) of the present method is from 86-97° C. Preferably, the heating period is from 85 to 170 seconds.

In a preferred embodiment of the present method, the milk-protein composition is selected from the group consisting of fresh milk, whole milk, skim milk, milk powder, condensed skim milk and dairy cream, or a combination thereof.

For adjusting the pH of the present method in step c), an organic acid is preferably selected from lactic acid, citric acid and acetic acid, or a combination thereof.

The pH-adjusted liquid dairy blend is processed in step d) of the present method to preferably obtain fat droplets of substantially uniform size. In an embodiment, fat droplets having an average diameter less than about 2 μm are obtained by the processing, and preferably an average diameter from about 1.5 μm to about 1.8 μm. For example, the processing can be performed by homogenizing the liquid dairy blend with a shear pump having a fixed plate having teeth that intermesh with teeth on a rotary plate that rotates at about 10,000 rpm. As another example, the processing can be performed by a dairy homogenizer that uses a piston and operates at 600 psi. The present invention is not limited to a specific process for homogenizing the mixture in step d) to preferably obtaining fat droplets of substantially uniform diameter, and any process available to the skilled artisan that results in the fat droplets of the pH-adjusted liquid dairy blend having an average diameter of less than about 2 μm can be used. In an embodiment, the processing forms fat-protein aggregates having a diameter from about 5 μm to about 200 μm and preferably from about 10 μm to about 100 μm.

The processed liquid dairy blend is heat treated in step e) of the method of the present invention to form an at least partially coagulated protein matrix. The heat treatment can be performed at a temperature from 85° C. to 100° C. for a time period from 1 to 3 minutes, preferably from 1.5 minutes to 2.5 minutes and more preferably for about 2.0 minutes. In a preferred embodiment, the temperature of the heat treatment is about 85° C. Typically, at least 30%, preferably at least 45%, more preferably at least 60% of the dairy protein in the liquid dairy blend is converted into the partially coagulated protein matrix. Heat treatment under these conditions does not lead to precipitation.

After the heat treatment, the heat-treated liquid dairy blend comprising the at least partially coagulated protein matrix can be cooled; in an embodiment, the blend is immediately cooled after the heat treatment. For example, the heat-treated liquid dairy blend can be cooled to about 60° C. or below.

In an embodiment, the resultant liquid dairy blend comprising the at least partially coagulated protein matrix has from 2.0% to 5.0% protein and preferably from 3.6% to 4.5% protein, from 1%, 2% or 5% to about 15% fat and preferably about 10% fat, and a pH from 5.8 to 6.2.

One aspect of the present invention pertains to a liquid dairy blend obtainable by the method described above.

A further aspect of the present invention relates to a food product made with the liquid dairy blend of the present invention. Such a food product can be a culinary sauce, a soup, a gravy, a pre-prepared dish, or a component of a pre-prepared dish.

For that, the liquid dairy blend of the present invention comprising the partially coagulated protein matrix can then be mixed with further ingredients to form for example a dairy-based culinary sauce. In an embodiment, the liquid dairy blend can be concentrated by removing at least a portion of the water therein before being added to the further ingredients. The liquid dairy blend can be a major component of a dairy-based culinary sauce; for example, the liquid dairy blend can be at least 20% of the dairy-based culinary sauce, more preferably at least 50% of the dairy-based culinary sauce, even more preferably at least 65% of the sauce, and most preferably at least 80% of the sauce.

Typically, the further ingredients for a dairy-based culinary sauce include fat, salts, milk solids non-fat, stabilizers, emulsifiers, flavorants, spices, proteins, water, acidifying components, alkalinizing components or any combinations thereof. However, some embodiments of the culinary sauce do not have a sweetening agent that imparts sweetness to the sauce, such as natural sugars, other plant derived nutritive sweeteners, and non-nutritive high intensity sweeteners.

Non-limiting examples of suitable dairy-based culinary sauces comprising the liquid dairy blend of the present invention include cheese sauce, Alfredo sauce and other dairy-based pasta sauces, béchamel sauce, beurre blanc, Caesar dressing, dairy-based toppings, dairy-based fillings, and the like. The culinary sauce is not limited to a specific embodiment, and the culinary sauce can be any dairy-based sauce known to the skilled artisan.

The sauce comprising the liquid dairy blend of the present invention can undergo further processing. For example, the sauce can be heated to a temperature from about 87° C. to about 93° C. for a time from about 5 minutes to about 12 minutes.

In an embodiment, the dairy-based culinary sauce comprises from 0.1% to 0.2% of an emulsifier. In another embodiment, the sauce does not have an emulsifier and relies on the proteins for texture. In such an embodiment, the sauce can also be essentially free of dextrins, fibers, hydrocolloids, gums and chemically or physically-modified starches. "Essentially free" means that these materials are not intentionally added for their conventional property imparting abilities, e.g. emulsifying and/or stabilizing, although there could be unintended minor amounts present without detracting from the performance of the sauces. In a preferred embodiment, the sauce contains such materials but without relying on and/or without increasing their amount relative to typical dairy-based culinary sauces. For example, an embodiment of the dairy-based culinary sauce has less than about 4% starch and gum, preferably less than about 2.0% starch and gum and most preferably less than about 1.5% starch and gum. In such embodiments, the culinary sauce can have less than about 2% flour.

The dairy-based culinary sauce comprising the liquid dairy blend of the present invention can be added to one or more other food components, such as pasta, vegetables, fruits, protein, grains such as rice, or the like to form a food product. For example, the dairy-based culinary sauce can be added to one or more other ingredients to form creamed chipped beef; a dough-based product with a dairy-based sauce, such as a sandwich or a pizza; macaroni and cheese; fettuccini Alfredo; potatoes au gratin; spinach and artichoke dip; a food product at least partially covered in cheese sauce; or the like. The dairy-based sauce may be a foundation for a culinary product such as for use in a soup, a spread or a condiment.

An embodiment of the food product of the present invention pertains to a frozen food product, which can be a frozen pre-prepared dish, or a sauce used as a component in a pre-prepared dish.

The resultant food product can be positioned in a container, such as a microwaveable tray, and then chilled and/or frozen. After purchase, a consumer can heat the food product for consumption individually or with other food products and at a temperature of the food product being above room temperature. The dairy-based culinary sauce comprising the liquid dairy blend of the present invention can maintain its organoleptic properties during and after re-heating.

A still further aspect of the present invention is the use of the liquid dairy blend of the present invention for use in the preparation of a food product for reducing the total fat and/or oil content of said food product.

Use of the liquid dairy blend of the present invention can achieve a reduction in fat of up to 60% relative to dairy-based culinary sauces lacking the partially coagulated protein matrix, while maintaining acceptable sensory qualities of the dairy-based culinary sauce. For example, experimental testing indicated that a standard Alfredo sauce had about 21% fat while an Alfredo sauce comprising the liquid dairy blend had about 9% fat, and a standard macaroni and cheese sauce had about 11.3% fat while a macaroni and cheese sauce comprising the liquid dairy blend had about 7.6% fat.

In an embodiment, the dairy-based culinary sauce comprising the liquid dairy blend of the present invention has a viscosity from about 1800 cp to about 3600 cp.

An even still further aspect of the present invention is the use of the liquid dairy blend of the present invention for use in the preparation of a food product for improving the visual aspect of said food product when cooked e.g. in an oven.

Those skilled in the art will understand that they can freely combine all features of the present invention disclosed herein. In particular, features described for the liquid dairy blend can be combined with the features of producing a liquid dairy blend and vice versa. Further, features described for different embodiments of the present invention may be combined.

Further advantages and features of the present invention are apparent from the Figures and Examples.

EXAMPLES

Example 1: Process of Making a Liquid Dairy Blend

Batch Process:

30.9 liters of water are added to a vessel capable of vigorous mixing and steam-jacketed heating. 16.8 kg of Condensed Skim Milk (34% solids), and 16.5 kg of Heavy Cream (40% Butterfat) are added to the vessel and mixed well. With vigorous agitation, 690 g of Whey Protein Concentrate powder (e.g. Bravo 250 from Grande Custom Ingredients Group) and 100 g of Panodan emulsifier (Mono- & Diglycerides) are added and blended until fully dispersed. 90 g of liquid (88%) Lactic Acid is added slowly, and the pH is measured and adjusted after 5 minutes of mixing. The finished blend is then heated to 60° C., homogenized with a standard piston homogenizer at 1500 psi (100 bar), and returned to the original mixing vessel. The blend is heated further to 85° C. and held at this temperature for a minimum of 90 seconds. 35 liters of cold water and/or ice are then added to the vessel to cool the product below 60° C. and terminate the reaction, and the finished Liquid Dairy Blend is stored under refrigeration until use. This 100 kg of finished Liquid Dairy Blend is represented in the first column in Table I below under "Liquid Dairy Blend Single-Strength", and may be used as-is or further diluted in formulation of finished sauces, soups, or other meal components.

Continuous Process:

171 liters of water are added to a vessel capable of vigorous mixing and steam-jacketed heating. 104 kg of Condensed Skim Milk (34% solids), and 101 kg of Heavy Cream (40% Butterfat) are added to the vessel and mixed well. With vigorous agitation, 4.25 kg of Whey Protein Concentrate powder (e.g. Bravo 250 from Grande Custom Ingredients Group) and 600 g of Panodan emulsifier (Mono- & Di-Glycerides) are added and blended until fully dispersed. 560 g of liquid (88%) Lactic Acid is added slowly, and the pH is measured and adjusted after 5 minutes of mixing. The finished blend is then heated to 60° C., homogenized with a standard piston homogenizer at 1500 psi (100 bar), and transferred to the next step in the continuous process. The blend is heated further to 85° C. (e.g. using direct steam injection) and held at this temperature for a minimum of 90 seconds. Following the holding time, the blend is cooled (e.g. through a tubular or plate heat exchanger) to terminate the reaction, and stored under refrigeration until use. This 400 kg of finished Liquid Dairy Blend is represented in the second column below in Table I under "Liquid Dairy Blend 65% Concentrate", and may be used as-is or further diluted in formulation of finished sauces, soups, or other meal components.

TABLE I

DAIRY FAT BASED LIQUID DAIRY BLENDS

| Ingredient | Liquid Dairy Blend Single-Strength | Liquid Dairy Blend 65% Concentrate | Liquid Dairy Blend 50% Concentrate |
|---|---|---|---|
| Water | 65.83% | 42.63% | 26.90% |
| Condensed Skim Milk | 16.82% | 25.88% | 33.64% |
| Heavy Cream (40% fat) | 16.47% | 25.34% | 32.94% |
| Whey Protein Concentrate | 0.69% | 1.06% | 1.38% |
| Emulsifier | 0.10% | 0.15% | 0.20% |
| Lactic or Citric Acid | 0.09% | 0.14% | 0.14% |
| Steam | — | 4.80% | 4.80% |
| Total | 100.00% | 100.00% | 100.00% |
| Fat Content | 6.7% | 10.3% | 13.2% |
| Protein Content | 2.3% | 3.6% | 4.7% |
| Fat:Milk Protein Ratio | 2.9 | 2.9 | 2.9 |
| Whey Protein:Casein Ratio | 0.38 | 0.38 | 0.38 |

The "65% Concentrate" above refer to 35% of the batch weight as water having been removed from the "Single-Strength" formula, yielding a more concentrated version of the Liquid Dairy Blend which is more useful as a semi-finished component in a variety of finished product applications. Similarly the "50% Concentrate" has had 50% of the batch weight removed as water.

Example 2: Vegetable Oil Based Liquid Dairy Blend

Similarly as described in Example 1, liquid dairy blends can be produced by replacing the dairy fat component of the blend of Example 1 with a corresponding same amount of a liquid vegetable oil. The milk protein and water components of the vegetable oil based liquid dairy blend have to be adjusted to the corresponding concentrations of the dairy blend of Example 1 as well. The resulting compositions of the liquid dairy blends are then as shown in Table II.

TABLE II

VEGETABLE OIL BASED LIQUID DAIRY BLENDS

| Ingredient | Liquid Dairy Blend Single-Strength | Liquid Dairy Blend 65% Concentrate | Liquid Dairy Blend 50% Concentrate |
|---|---|---|---|
| Water | 73.55% | 58.51% | 42.34% |
| Condensed Skim Milk | 18.98% | 25.20% | 37.96% |
| Vegetable Oil | 6.59% | 10.14% | 13.18% |
| Whey Protein Concentrate | 0.69% | 1.06% | 1.38% |
| Emulsifier | 0.10% | 0.15% | 0.20% |
| Lactic or Citric Acid | 0.09% | 0.14% | 0.14% |
| Steam | — | 4.80% | 4.80% |
| Total | 100.00% | 100.00% | 100.00% |
| Fat Content | 6.7% | 10.3% | 13.4% |
| Protein Content | 2.3% | 3.6% | 4.7% |
| Fat:Milk Protein Ratio | 2.9 | 2.9 | 2.9 |
| Whey Protein:Casein Ratio | 0.37 | 0.37 | 0.37 |

The "65% Concentrate" above refer to 35% of the batch weight as water having been removed from the "Single-Strength" formula, yielding a more concentrated version of the Liquid Dairy Blend which is more useful as a semi-finished component in a variety of finished product applications. Similarly the "50% Concentrate" has had 50% of the batch weight removed as water.

Example 3: Physical Properties of Liquid Dairy Blends

Liquid dairy blends were made according to the process as described in Example 1 and were tested for their physical properties and behaviors as follows:

Trials were conducted to establish the optimum pH range for the Dairy Fat Based Liquid Dairy Blend (65% Concentrate). The basic formula and process according to the "Continuous Process" in Example 1 were followed. During the process, incremental amounts of acid were added to progressively reduce the pH of the raw blend at the mixing stage, and corresponding samples were taken after processing and cooling, and analyzed using a Brookfield Digital Viscometer. The result is shown in FIG. 1. Maximum viscosity readings in excess of 800 cP were obtained in the pH range of 5.90-6.10.

The high viscosity region reflects a positive condition for controlled protein denaturation, resulting in a thicker, creamier Liquid Dairy Blend. The low viscosities observed at pH greater than 6.2 indicate a lack of protein denaturation, and a predominance of unreacted proteins. The sharp decline in viscosity values at pH less than 5.85 reflect an over-denaturation and/or precipitation of the dairy proteins, resulting in a thin liquid matrix containing larger precipitated protein particulates. For successful application of the current technology, pH control is critical to maintain the desired viscosity and texture.

Figure 2:
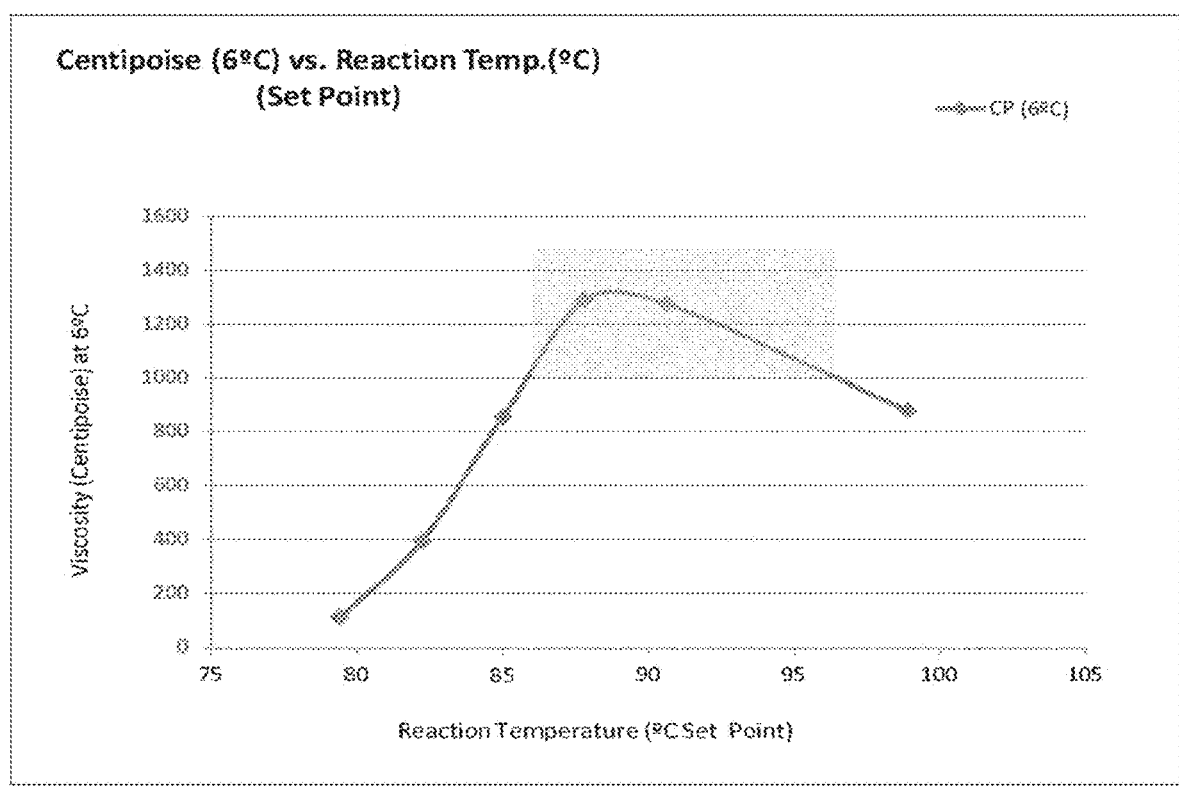
FIG. 2: Viscosity of the Liquid Dairy Blends versus temperature of the heating step in making the blends

2. Viscosity of the Blend Versus Temperature of the Heating Step for Making the Blend Trials were conducted to establish the optimum reaction temperature range for the Dairy Fat Based Liquid Dairy Blend (65% Concentrate). The basic formula and process according to the "Continuous Process" in Example 1 were followed. During the heating process, the set point for final (steam injection) heating was advanced incrementally, and corresponding samples were taken after processing and cooling, and analyzed using a Brookfield Digital Viscometer. The result is shown in FIG. 2. Maximum viscosity readings in excess of 1000 cP were obtained with reaction (set point) temperatures in the range of 86-97° C.

The high viscosity region reflects a positive condition for controlled protein denaturation, resulting in a thicker, creamier Liquid Dairy Blend. The low viscosities observed at reaction temperatures less than 86° C. indicate a lack of protein denaturation, and a predominance of unreacted proteins. The decline in viscosity values at reaction temperatures greater than 95° C. reflect an over-denaturation and/or precipitation of the dairy proteins, resulting in a thin liquid matrix containing larger precipitated protein particulates. For successful application of the current technology, control or reaction temperature is critical to maintain the desired viscosity and texture.

Figure 3:
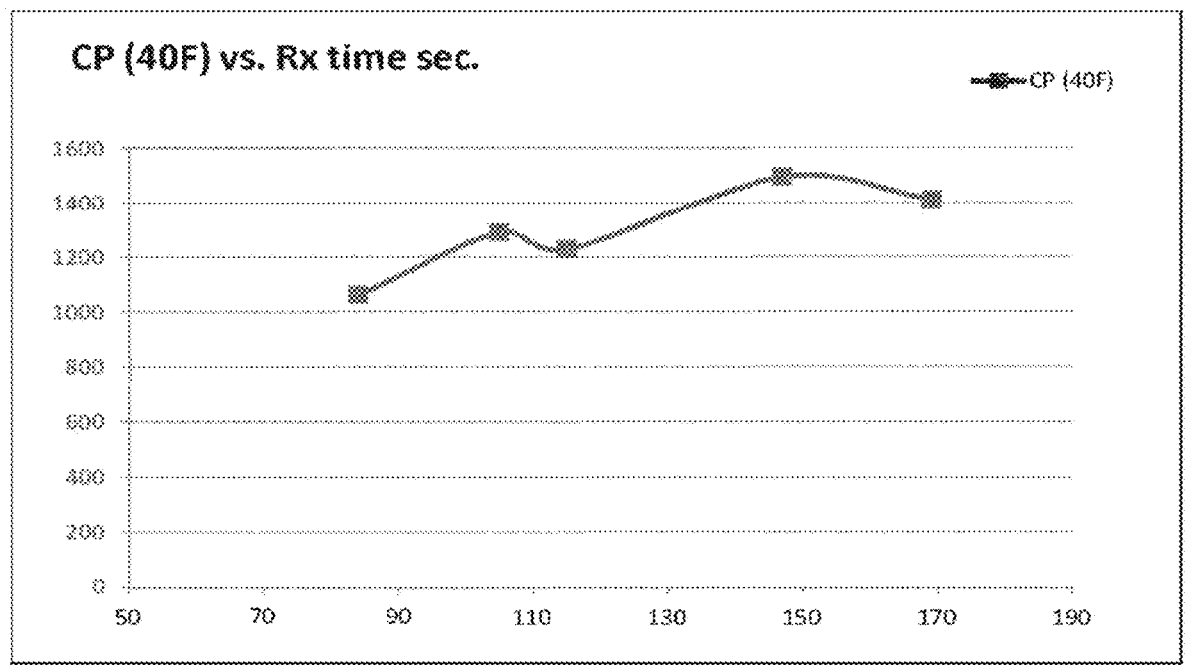
FIG. 3: Viscosity of the Liquid Dairy Blends versus holding time at high temperature during the making of the blends)

3. Viscosity of the Blend Versus Holding Time at High Temperature During Process Trials were conducted to establish the optimum reaction hold time range for the Dairy Fat Based Liquid Dairy Blend (65% Concentrate). The basic formula and process according to the "Continuous Process" in Example 1 were followed. Individual smaller batches were prepared and an optimized heating process, with set point for final (steam injection) heating at 89° C., was applied. The holding tube length was adjusted incrementally between batches to provide multiple holding times between 85 and 170 seconds. Corresponding samples were taken after processing and cooling, and analyzed using a Brookfield Digital Viscometer. The result is shown in FIG. 3. Maximum viscosity readings in excess of 1000 cP were obtained with all hold times in the range of 85-170 seconds.

Data suggests that hold times less than 85 seconds may be too short for the desired reaction to occur fully, and that hold times greater than 150 seconds may result in the beginning of over-denaturation and/or precipitation of dairy proteins, resulting in a thin liquid matrix containing larger precipitated protein particulates.

4. Impact of the Whey-Protein:Casein Ratio

Figure 4:
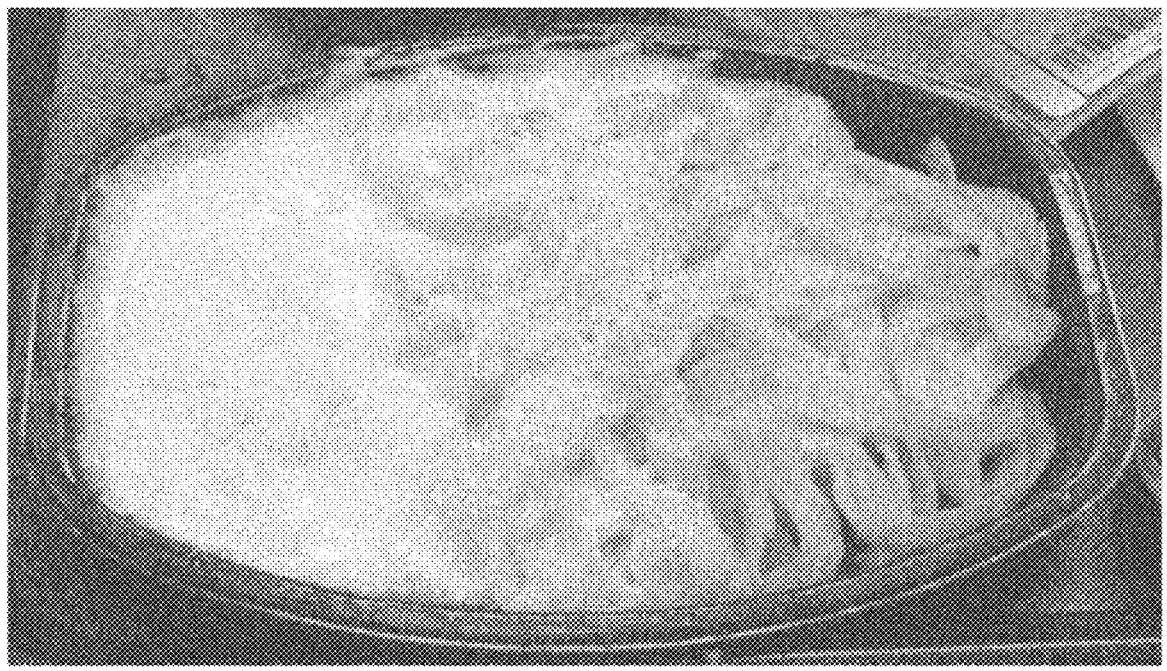
FIG. 4: Cheese sauce examples scoring "0" (best) and "5" (worst)
Figure 4:

Early in development of these Liquid Dairy Blends, it was noted that some product recipes containing the blends performed better than others when final preparation from frozen state was carried out in a conventional oven under relatively severe conditions (e.g. 177° C. for 45 minutes without mixing), a method used for reheating of frozen dishes by many consumers. Products performing well were characterized by a smooth sauce appearance before and after mixing of the product at the end of this heating time. Products performing poorly were characterized by a coarse "curdled" appearance before and/or after mixing of the product at the end of the heating step. Individual samples were scored on a 0-to-5 point scale, with 0 being best and 5 being worst. Examples of samples scoring "0" and "5" are shown in FIG. 4 below.

Further investigations of multiple existing product samples and their performance during this reheating step indicated that a primary cause of the curdling effect was related to the level of added whey protein in the product, and more specifically the level of unreacted whey protein present in the product at the time of reheating. The Table III below summarizes results obtained from testing of a selected group of samples (Sauces A-G).

TABLE III

| Description | LDB Format | Sauce Wt % LDB | Sauce Wt % Fat | Sauce Wt % WPC | Sauce Wt % WP | Sauce Wt % Cas | WP:C as Ratio | Oven Score |
|---|---|---|---|---|---|---|---|---|
| Sauce 47A | 65 Conc. | 5.0 | 17.6 | 0.13 | 0.51 | 1.90 | 0.27 | 0 |
| Sauce 46B | 65 Conc. | 22.2 | 14.7 | 0.60 | 0.64 | 1.80 | 0.35 | 0 |
| Sauce 19C | 65 Conc. | 67.6 | 12.5 | 1.00 | 0.78 | 1.84 | 0.46 | 0.5 |
| Sauce 55D | 65 Conc. | 55.5 | 8.8 | 1.49 | 0.89 | 1.59 | 0.56 | 1 |
| Sauce 64E | 65 Conc. | 56.0 | 8.8 | 1.50 | 0.89 | 1.60 | 0.56 | 2 |
| Sauce 52F | 65 Conc. | 56.2 | 8.8 | 1.50 | 0.89 | 1.61 | 0.56 | 5 |
| Sauce 87G | 50 Conc. | 43.2 | 8.8 | 1.50 | 0.93 | 1.72 | 0.54 | 5 |
| Sauce 142H | 65 Conc. | 56.2 | 8.8 | 0.59 | 0.57 | 1.52 | 0.38 | 0 |

Strong correlations were found between both the level of Liquid Dairy Blend in the sauce, as well as the amount of total whey protein in the sauce, and the Oven Scores higher levels of whey protein resulting in poor oven performance. Further analysis of processed Liquid Dairy Blends, containing similar levels of whey protein to those found in Sauces A-G, indicated that up to 30% of the whey protein present was still unreacted, and available for subsequent over-reaction during oven heating, reaching temperatures in excess of 97° C. Since the amount of Liquid Dairy Blend used in the sauce is directly related to the achievable level of fat reduction, subsequent trials were conducted containing a 30%-reduced level of whey protein (Sauce H) in order to minimize the level of residual unreacted whey protein in the sauce. Positive results were observed during subsequent oven reheating of these sauces.

From this set of experiments it can be concluded that a liquid dairy blend comprising whey proteins to casein proteins in a final ratio of about 27:73 wt % (=0.37) provides good results as to the appearance upon oven cooking when used in applications with a reduced amount of fat. For example, Sauces 46B and 142H in Table III produced the same good quality result as Sauce 47A, which had substantially more total fat (i.e. 17.6%, instead of only 14.7 or 8.8% fat for the other two Sauces). Liquid Dairy Blends comprising a whey protein to casein ratio of e.g. 19:81 wt % (=0.234) and as found normally in whole milk, or of a ratio of 0.27 as shown for Sauce 47A, need a significantly higher amount of fat for providing a same good cooking result as mentioned above. On the other hand, the set of experiments also provided evidence that when the whey protein to casein ratio is about 35:65 wt % (=0.538) or above, the Sauce tends to curdle upon a cooking step. Hence, those latter compositions are less preferred.

Hence, good cooking results can be achieved with a dairy blend comprising whey protein and casein protein in a ratio of about 0.3-0.5 by weight, preferably in a ratio of about 0.35-0.43 by weight.

5. Impact of Homogenization Pressure and Fat Droplet Particle Size

Once the optimum protein content and composition was established, the parameter of fat droplet particle size was examined more closely. The hypothesis that smaller and therefore more numerous fat droplets would yield a greater perception of fat presence was proven by producing Liquid Dairy Blends according to the optimized formula developed in Example 4 above. The homogenization pressure was varied between 600 psi (40 bar) and 1500 psi (100 bar) and sauces were prepared with the resulting Liquid Dairy Blends. Fat droplet sizes were measured by laser diffraction analysis and determined to be (on average) 1.7 microns and 1.0 microns respectively. When evaluated by a trained sensory panel, differences between the 2 sauce samples containing these Liquid Dairy Blends were rated as significant, particularly with regard to smoothness of texture and mouthfeel, with the 1500 psi variant being closest to the full fat product.

Example 4: Applications of Liquid Dairy Blends in Culinary Sauces

The liquid dairy blend of the present invention was tested in several pilot applications for making culinary sauces which can be used in for example prepared dishes such as Macaroni & Cheese as shown below in Table IV and for Italian Cheese sauce as shown in Table V.

TABLE 5

Sauce Examples Macaroni & Cheese

| Ingredient | Full Fat Macaroni & Cheese | Macaroni & Cheese Made with Single Strength LDB | Macaroni & Cheese Made with Concentrated LDB |
| --- | --- | --- | --- |
| Cream/Milk Blend (3.5% Fat) | 45.02% | — | — |
| Liquid Dairy Blend (SS) (6.7% Fat) | — | 6.6% | — |
| Liquid Dairy Blend (Concentrated - 10.2% Fat) | — | — | 4.3% |
| Skim Milk | — | 27.2% | 28.3% |
| Water | — | 12.72% | 13.92% |
| Butter (80% fat) | 2.2% | 0.7% | 0.7% |
| Seasonings | 0.12% | 0.12% | 0.12% |
| Salt | 0.63% | 0.63% | 0.63% |
| Xanthan Gum | 0.03% | 0.03% | 0.03% |
| Wheat Flour | 2.4% | 2.4% | 2.4% |
| Cheeses | 12.3% | 12.3% | 12.3% |
| Cooked Macaroni | 37.3% | 37.3% | 37.3% |
| Fat Content | 7.5% | 5.1% | 5.1% |

A significant fat reduction in excess of 30% was achieved using the Liquid Dairy Blends to replace both the higher-fat Cream/Milk blend as well as 68% of the butter in the full fat Macaroni & Cheese formula. When evaluated by a trained sensory panel, differences between the full fat product and product containing the Liquid Dairy Blend were rated as not significant.

TABLE V

Sauce Example Italian Cheese Sauce

| Ingredient | Full Fat Italian Cheese Sauce | Italian Cheese Sauce Made with Single Strength LDB | Italian Cheese Sauce Made with Concentrated LDB |
| --- | --- | --- | --- |
| Cream/Milk Blend (18% Fat) | 82.41% | — | — |
| Liquid Dairy Blend (SS) (6.7% Fat) | — | 85.86% | — |
| Liquid Dairy Blend (Concentrated - 10.2% Fat) | — | — | 55.66% |
| Skim Milk | — | — | 9.25% |
| Water | — | — | 20.95% |
| Vegetable Oil | 2.6% | — | — |
| Seasonings | 0.95% | 0.30% | 0.30% |
| Salt | 0.97% | 0.97% | 0.97% |
| Xanthan Gum | 0.07% | 0.07% | 0.07% |
| Corn Starch | 1.8% | 1.6% | 1.6% |
| Cheeses | 11.2% | 11.2% | 11.2% |
| Fat Content | 20.6% | 8.8% | 8.8% |

A significant fat reduction in excess of 50% was achieved using the Liquid Dairy Blend to replace both the higher-fat Cream/Milk blend as well as 100% of the vegetable oil in the full fat Italian Cheese Sauce formula. When evaluated by a trained sensory panel, differences between the full fat product and product containing the Liquid Dairy Blend were rated as not significant.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid dairy blend comprising skim milk, dairy cream, and whey protein concentrate, the liquid dairy blend having a total whey-protein:casein ratio of about 0.38 by weight, the liquid dairy blend comprising about 10 wt. % total fat, and the pH of the liquid dairy blend is from 5.9-6.1.

2. The liquid dairy blend according to claim 1, the liquid dairy blend further comprising an emulsifier.

3. The liquid dairy blend according to claim 2, wherein the emulsifier is selected from the group consisting of monoglycerides, diglycerides, acacia gum, lecithin, and combinations thereof.

4. The liquid dairy blend according to claim 1, the liquid dairy blend comprising fat droplets having an average diameter from 0.2 µm to 2 µm.

5. The liquid dairy blend according to claim 4, wherein the fat droplets have an average diameter of 0.6 µm-1.8 µm.

6. The liquid dairy blend according to claim 4, wherein the fat droplets have an average diameter of about 1.5 µm-about 1.8 µm.

7. A food product comprising a liquid dairy blend comprising skim milk, dairy cream, and whey protein concentrate, the liquid dairy blend having a total whey-protein:casein ratio of about 0.38 by weight, the liquid dairy blend comprising about 10 wt. % total fat, and the pH of the liquid dairy blend is from 5.9-6.1.

8. The food product according to claim 7, wherein the food product is selected from the group consisting of a culinary sauce, a soup, a gravy, a pre-prepared dish, and a component of a pre-prepared dish.

9. The food product according to claim 7, wherein the food product is a frozen food product.

* * * * *